United States Patent
Lakkundi et al.

(10) Patent No.: US 12,242,438 B1
(45) Date of Patent: Mar. 4, 2025

(54) METHOD FOR INTELLIGENT, DYNAMIC, REALTIME, ONLINE RELOCATION OF PLUGGABLE DATABASES ACROSS NODES BASED ON SYSTEM RESOURCE PRESSURE

(71) Applicant: Oracle International Corporation, Redwood Shores, CA (US)

(72) Inventors: Vijayendra Rao Lakkundi, Telangana (IN); Sue-Kyoung Lee, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/494,597

(22) Filed: Oct. 25, 2023

(51) Int. Cl.
*G06F 16/00* (2019.01)
*G06F 16/21* (2019.01)

(52) U.S. Cl.
CPC .................. *G06F 16/214* (2019.01)

(58) Field of Classification Search
CPC .................................................. G06F 16/214
USPC ............................................................ 707/809
See application file for complete search history.

(56) References Cited

U.S. PATENT DOCUMENTS

| | | | |
|---|---|---|---|
| 7,526,634 B1 | 4/2009 | Duluk, Jr. et al. | |
| 8,874,457 B2 | 10/2014 | Biran et al. | |
| 9,189,260 B2 | 11/2015 | Attalla et al. | |
| 9,424,094 B2 | 8/2016 | Cardosa et al. | |
| 10,521,747 B2 | 12/2019 | Warner | |
| 11,163,647 B2 | 11/2021 | Chopra et al. | |
| 11,853,753 B1 * | 12/2023 | Chawda | G06F 11/34 707/707 |
| 2002/0124127 A1 | 9/2002 | Dawkins | |
| 2002/0138679 A1 | 9/2002 | Koning et al. | |
| 2005/0198102 A1 | 9/2005 | Hahn et al. | |
| 2012/0151496 A1 | 6/2012 | Tebbs | |
| 2013/0047135 A1 | 2/2013 | Joshi et al. | |
| 2014/0143773 A1 | 5/2014 | Ciano | |
| 2015/0089274 A1 | 3/2015 | Mares et al. | |
| 2016/0380905 A1 | 12/2016 | Wang | |

(Continued)

OTHER PUBLICATIONS

Yu et al., "Intelligent Database Placement in Cloud Environment", 2012 IEEE 19th International Conference on Web Services, Year 2012, 8 pages.

(Continued)

*Primary Examiner* — Alexandria Y Bromell
(74) *Attorney, Agent, or Firm* — Hickman Becker Bingham Ledesma LLP; Marcel K. Bingham

(57) ABSTRACT

Techniques are provided for implementing a pluggable database monitoring system that groups running processes for the pluggable database into a grouping and monitors resource usage for the grouping to determine whether to migrate the pluggable database to another container. A system identifies a set of running processes associated with a pluggable database. The pluggable database is hosted on a container DBMS, which is hosted on a virtual machine. The system generates a first grouping that contains the set of running processes. The system monitors, in real-time, aggregated resource usage of the first grouping to determine if the aggregated resource usage exceeds a first threshold. In response to the aggregated resource usage of the first grouping exceeding the first threshold, the system migrates the first pluggable database to a second container DBMS.

22 Claims, 6 Drawing Sheets

(56) References Cited

U.S. PATENT DOCUMENTS

| | | | |
|---|---|---|---|
| 2017/0046205 A1 | 2/2017 | Kofkin-Hansen | |
| 2017/0116235 A1 | 4/2017 | Yam et al. | |
| 2017/0199770 A1* | 7/2017 | Peteva | G06F 9/5088 707/707 |
| 2018/0095776 A1 | 4/2018 | Tsai | |
| 2018/0203744 A1 | 7/2018 | Weismaler | |
| 2019/0377611 A1 | 12/2019 | Khan et al. | |
| 2020/0067789 A1 | 2/2020 | Khuti | |
| 2022/0382721 A1 | 2/2022 | Muthukrishnan et al. | |
| 2022/0067061 A1 | 3/2022 | Mankad | |
| 2023/0367749 A1* | 11/2023 | Xiong | G06F 16/214 707/707 |

OTHER PUBLICATIONS

Talebian et al., "Optimizing Virtual Machine Placement in IaaS Data Centers: Taxonomy, Review and Open Issues", Springer Nature 2019, https://doi.org/10.1007/s10586-019-02954-, dated Jun. 2019, 42 pages.

Masdari et al., "An Overview of Virtual Machine Placement Schemes in Cloud Computing", Journal of Network and Computer Applications, http://dx.doi.org/10.1016/j.jnca.2016.01.011, dated Jan. 2016, 34 pages.

Gulati et al., "VMware Distributed Resource Management: Design, Implementation, and Lessons Learned", https://www.waldspurger.org/carl/papers/drs-vmtj-mar.12.pdf, Year 2012, 20 pages.

Docs.Oracle.com, "Oracle Cloud Infrastructure Documentation: Provisioning the First VM Cluster on an Exadata Cloud@ Customer System", https://docs.oracle.com/en-us/iaas/Content/home.htm, retrieved Mar. 2, 2022, 7 pages.

Docs.Oracle.com, "Oracle Cloud Infrastructure Documentation: Manage VM Clusters", https://docs.oracle.com/en-us/iaas/Content/home.htm, retrieved Mar. 2, 2022, 26 pages.

Docs.Oracle.com, "Oracle Cloud Infrastructure Documentation: Compute Shapes", https://docs.oracle.com/iaas/Content/home.htm, retrieved Mar. 2, 2022, 14 pages.

Alashaikh et al., "A Survey on the Use of Preferences for Virtual Machine Placement in Cloud Data Centers", https://arxiv.org/pdf/1907.07778.pdf, dated Jan. 16, 2020, 40 pages.

Muthukrishnan, U.S. Appl. No. 17/334,360, filed May 28, 2021, Non-Final Rejection, May 11, 2023.

Muthukrishnan, U.S. Appl. No. 17/334,360, filed May 28, 2021, Final Rejection, Oct. 26, 2023.

Duraisamy, U.S. Appl. No. 17/699,740, filed Mar. 21, 2022, Non-Final Rejection, Jul. 7, 2023.

* cited by examiner

METHOD FOR INTELLIGENT, DYNAMIC, REALTIME, ONLINE RELOCATION OF PLUGGABLE DATABASES ACROSS NODES BASED ON SYSTEM RESOURCE PRESSURE

FIELD OF THE INVENTION

The present invention relates to database systems, and more specifically to identifying resources dedicated to a pluggable database within a container database management system, monitoring resource metrics for the pluggable database, and migrating the pluggable database to a new container database management system if more resources are needed.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an operating system process or an operating system thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Multitenant Architecture

A container DBMS is a powerful mechanism for database consolidation. A container DBMS provides a high degree of computer resource sharing while concurrently providing a high degree of isolation. A container DBMS is based on a "container". A container is a collection of schemas, objects, and related structures in a multitenant container database (CDB) that appears logically to an application as a separate database. Within a CDB, each container has a unique ID and name. The root database and every pluggable database (PDB) is considered a container. A container DBMS may contain numerous PDBs. PDBs isolate data and operations so that from the perspective of a user or application, each PDB appears as if it were a traditional non-CDB. Each PDB is defined by its own separate database dictionary, defining database objects within the PDB. A user may access a PDB within a container DBMS by establishing a database session for a PDB.

The container DBMS stores the system metadata required to manage all PDBs within the container DBMS. In some implementations, the root database of a container DBMS stores data that is common across the PDBs of the container DBMS, such as definitions for common users and roles, shared tables, code packages, and so forth. A PDB comprises a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared database resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

A CDB enables computer resource amortization ("resource amortization"). The computer resources required to provision and host a PDB are in effect amortized between the multiple PDBs within a CDB. The computer resources needed per PDB are thereby reduced.

In a container DBMS, database server system processes are not dedicated on a per PDB basis, but rather serve multiple PDBs within a CDB. The overhead of database server system processes is thereby amortized across the multiple PDBs in the CDB.

A container DBMS provides isolation, at least to a degree. Database sessions established for a PDB may be limited to accessing or otherwise viewing database objects defined for the PDB by the PDBs dedicated database dictionary.

A container DBMS may implement various levels of isolation. While database objects may be isolated between database sessions of PDBs, various computing resources may be shared across database sessions of PDBs. Hosting multiple PDBs on the same database server thus allows the computing resources of database servers or instances to be shared between multiple PDBs.

By sharing computing resources between multiple PDBs, while still providing isolation for the multiple PDBs, a container DBMS is able to leverage a larger pool of computing resources for PDBs. For example, the container DBMS may contain two PDBs, a first PDB with a large dataset and heavy demand from database sessions, and a second PDB with a relatively small dataset and light demand from database sessions. The container DBMS may provision more computing resources to the first PDB and less resources to the second PDB. If demand for the second PDB increases to a point where the provisioned computing resources are not enough, a database administrator may adjust allocations of computing resources to provide more resources to the second PDB. However, currently, database administrators do not have a straightforward way of knowing how much computing resources are needed for the second PDB. Typically, database administrators will predict a database load for the second PDB, and based on their estimate, database administrators will provision enough resources for the second PDB such that the provision is able to handle peak loads on the second PDB. One issue with provisioning computing resources based on peak loads is that when the second PDB is not handling peak loads, the computing resources for the second PDB are over provisioned. Over provisioning resources to PDBs will lead to computing resources being underutilized.

Computing resources, such as CPU resources, memory resources, and I/O resources, for the container DBMS may be monitored to determine whether excess computing pressure is causing a strain on the container DBMS. Monitoring metrics at a CDB level may be beneficial when trying to understand whether the entire container DBMS is experiencing resource bottlenecks. However, this type of monitoring is far too coarse to provide meaningful metrics about individual PDBs running within the container DBMS. For example, the container DBMS may have provisioned 5 GB of memory, out of 500 GB total, to a first PDB. Monitoring memory resources at a container DBMS level, where the container DBMS has 500 GB of memory, may not provide any indication of memory pressure on the 5 GB allocated to the first PDB. This may become problematic for database administrators and developers for the first PDB if they wish to implement changes to the first PDB. For instance, if the database administrators plan to update the first PDB, which may increase the memory footprint for the first PDB, the database administrators have no way of knowing whether the increase will be detrimental to the first PDB because the database administrators have no visibility into what the current memory footprint and/or memory pressure is on the first PDB. As a result, the database administrators and developers may have to make an educated guess as to what the new memory provision should be for the first PDB. In light of the foregoing, it is desirable to provide a system that dynamically monitors resources assigned to pluggable databases and determines whether a pluggable database should be migrated to another container for additional computing resources.

DETAILED DESCRIPTION

Figure 1:
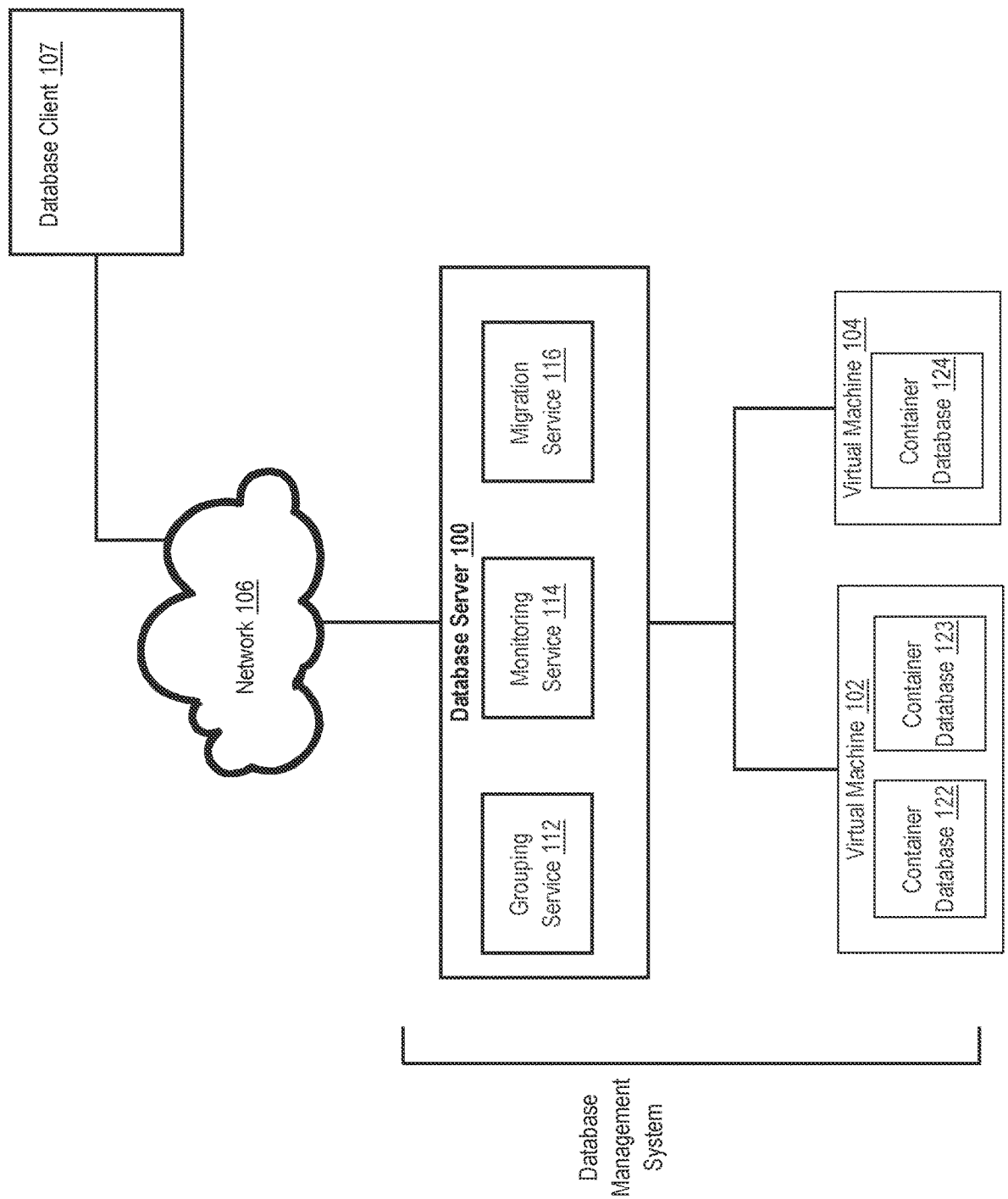
FIG. 1 illustrates an example computer-networking environment upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for implementing a pluggable database monitoring system configured to identify and group computing resources dedicated to a pluggable database, monitor the grouped computing resources, and determine whether the pluggable database should be migrated based on monitored metrics for the grouped computing resources.

In an embodiment, a grouping service identifies a set of running processes associated with a first pluggable database. The first pluggable database is hosted on a container database management system of a plurality of container database management systems hosted on a plurality of virtual machines. A first virtual machine, of the plurality of virtual machines, hosts a first container database management system, which hosts the first pluggable database. The grouping service, after identifying the set of running processes, generates a first grouping that contains the set of running processes associated with the first pluggable database.

In an embodiment, a monitoring service monitors, in real-time, aggregated resource usage of the set of running processes that make up the first grouping to determine if the aggregated resource usage of the first grouping exceeds a first threshold. The aggregated resource usage may incorporate resource types such as CPU usage, memory usage, and input/output usage rates. Additionally, the aggregated resource usage may represent an amount of contention on resource types such as the amount of time a process has to wait for memory to become free for processing tasks.

In an embodiment, in response to the aggregated resource usage of the first grouping exceeding the first threshold, the first pluggable database is migrated to a second container database management system of the plurality of container database management systems. The first threshold may be based on a percentage of resources allocated to the first pluggable database. For instance, the first threshold may represent when resource usage equals 80% of the total resources allocated to the first pluggable database.

In an embodiment, the grouping service may be implemented to maintain the set of running processes that are part of the grouping associated with the first pluggable database. If a process in the set of running processes, terminates, then the grouping service removes the terminated process from the grouping. If, however, a new process, associated with the first pluggable database, is spawned as a result of a new database session, then the grouping service would add the new process to the grouping.

In an embodiment, the monitoring service is implemented to generate alert notifications when monitored resource usage of the first pluggable database exceed a threshold, and send the alert notifications to users of the first pluggable database. The alert notifications may indicate that the first pluggable database is experiencing resource pressure and may be migrated to another container database management system.

By developing a system to group and monitor computing resources for a pluggable database running in a container database management system, resource pressure and bottlenecks may be identified and addressed prior to the pluggable database experiencing bottlenecks that may adversely affect user response time. Additionally, monitoring resources at a pluggable database level provide better insight into how resources are consumed by the pluggable database and may lead to less over-provisioning of resources, thereby freeing up computing resources that may be unnecessarily provisioned to a pluggable database that does not require as much resources as were provisioned.

Structural Overview

FIG. 1 illustrates an example computer-networking environment upon which an embodiment may be implemented. Although FIG. 1 only depicts a particular number of each element, a practical environment may have many more, perhaps hundreds or thousands, of each of the elements illustrated in FIG. 1.

In FIG. 1, database server 100 represents a combination of software and resources on one or more computing devices that are communicatively coupled to databases (CDB 122, CDB 123, and CDB 124) and are communicatively coupled to each other via network 106 and also to database client 107. Database server 100 runs an operating system instance. An example of an operating system instance is described below in the "Software Overview". CDB 122 and CDB 123 are implemented to run on virtual machine (VM) 102. CDB 124 is implemented to run on VM 104. VM 102 and VM 104 are virtual machines implemented to run one or more CDBs. In an embodiment, network 106 represents one or more local networks, wide area networks, internetworks, or service provider networks. In some embodiments, network 106 represents the Internet.

In an embodiment, the database client 107 represents a combination of software and resources on one or more computing devices which implements one or more applications that send commands to the database servers in order to retrieve, modify, delete, or submit data stored by the CDBs. An example of a computing device upon which the database servers may be implemented is described below in the "Hardware Overview".

CDBs

Figure 2:
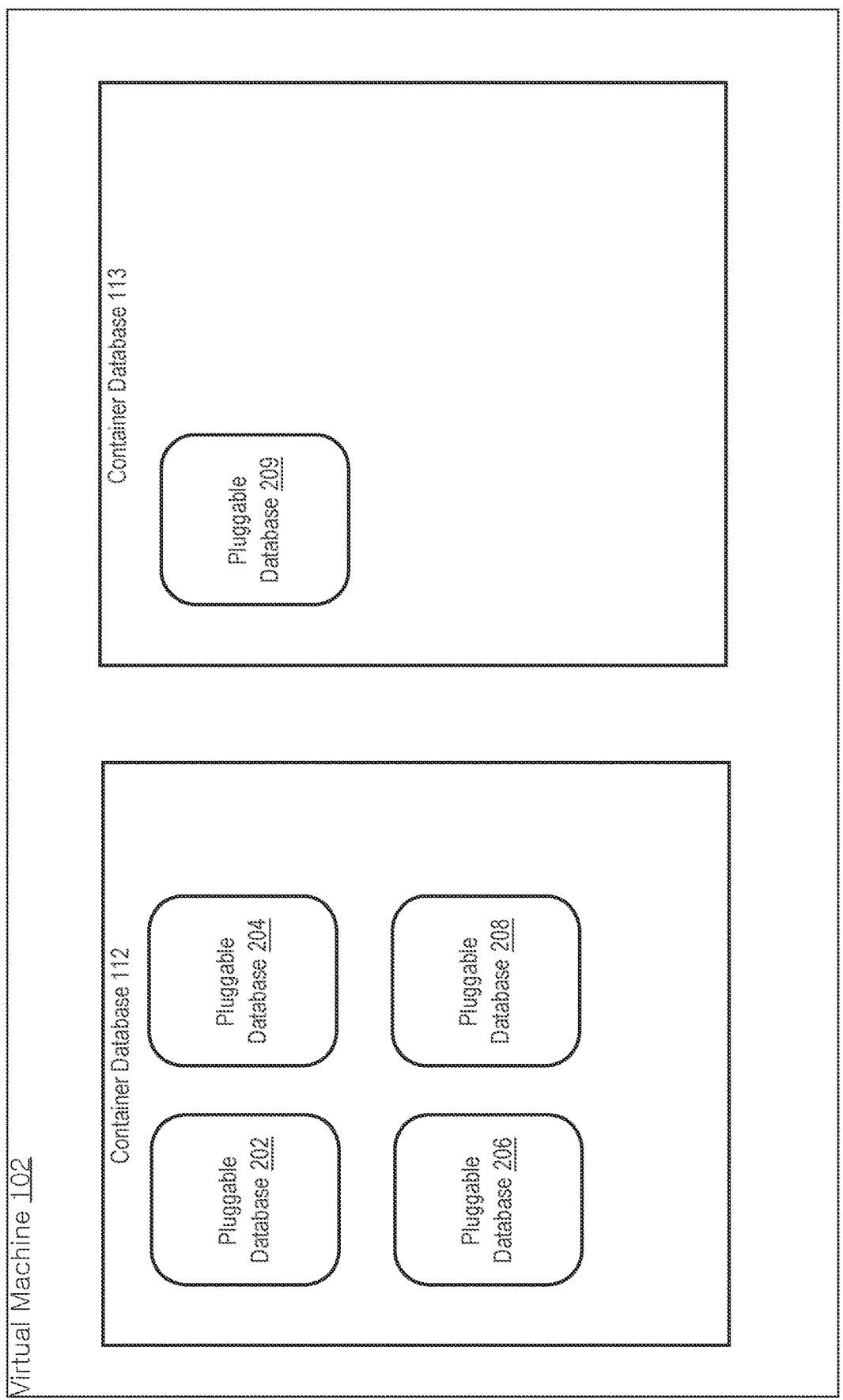
FIG. 2 illustrates an example of a virtual machine executing multiple container databases, according to an embodiment.

FIG. 2 illustrates an example of a virtual machine executing multiple container databases, according to an embodiment. VM 102 is depicted running CDB 112 and CDB 113. CDB 112 contains pluggable databases (PDB) 202, 204, 206, and 208, and CDB 113 contains PDB 209. Both CDB 112 and CDB 113 may contain root databases (not pictured). Each of the PDBs 202, 204, 206, 208, and 209 are hosted and managed by database server 100. In other embodiments CDB 112 and CDB 113 may contain more or less pluggable databases than the number of pluggable databases that are depicted in FIG. 2. PDBs 202, 204, 206, 208, and 209 each include a database dictionary and tables files for storing data for database objects.

The database server 100 is responsible for establishing and managing database sessions for each of the respective PDBs in CDB 112, 113, and 114. The database dictionary of the PDBs for which the database session is established determines the scope of the commands issued by database client 107 (e.g., which database(s) the command will be executed on), which permissions are checked, which database dictionaries will be used for the session, and so forth. A database session established for PDB may be referred to herein as running within the PDB. Referring back to FIG. 1, the database server 100 includes a grouping service 112, a monitoring service 114, and a migration service 116.

Grouping Service

In an embodiment, the grouping service 112 is implemented to identify processes associated with a particular PDB, and generate a grouping that contains each of the processes associated with the particular PDB. For example, when a new client session with PDB 202 is established a new process for that client session is spawned. If PDB 202 has 10 active sessions with 10 separate processes running for each of those sessions, then the 10 separate processes would be grouped together, by the grouping service 112, to form a "process group" for PDB 202.

In an embodiment, the grouping service 112 may add or remove processes from a process group depending on whether processes are terminated, new processes are spawned, or existing processes begin executing tasks for the PDB associated with the process group. For example PDB 202 is associated with a process group called "process group-A". If a client establishes a new database session with PDB 202, a new process for that session may be spawned, the grouping service 112 may identify that the new process is for the new database session for PDB 202 and may add the new process to the process group-A. In another example, if an existing database session for PDB 202, for which there is an existing database process running, is terminated, then the existing database process would also be terminated and the grouping service 112 would remove the existing database process from the process group-A.

In an embodiment, the grouping service 112 may also generate a process group for CDBs, where the process group contains processes associated with the root database and other background processes that are not specific to any single PDB. Examples of processes that would be in a CDB process group include, but are not limited to, database writer processes, a log writer process, a checkpoint process, a system monitor process, a process monitor process, and any other process that may perform work for any of the PDBs running within the CDB. For example, the log writer process is tasked to write redo data from redo log buffers to redo log files. The log writer process is assigned to a CDB process group for CDB 112. The grouping service 112 may move a process from the CDB process group to another process group if one of the background processes is executing a task for a specific PDB. For example, if the redo log buffer for PDB 202 is almost full, then the log writer process may be tasked to read the redo data from the redo log buffer for PDB 202 and write the redo data into redo log files. The grouping service 112 may detect that the log writer process, which is currently assigned to the CDB process group, is executing tasks for PDB 202, and may reassign the log writer process to the process group-A (process group for PDB 202) for the duration that the log writer process works on the task for PDB 202. Once the log writer process has completed the task of writing redo data to the redo log files for PDB 202, the grouping service 112 would then reassign the log writer process back to the CDB process group.

Figure 3:
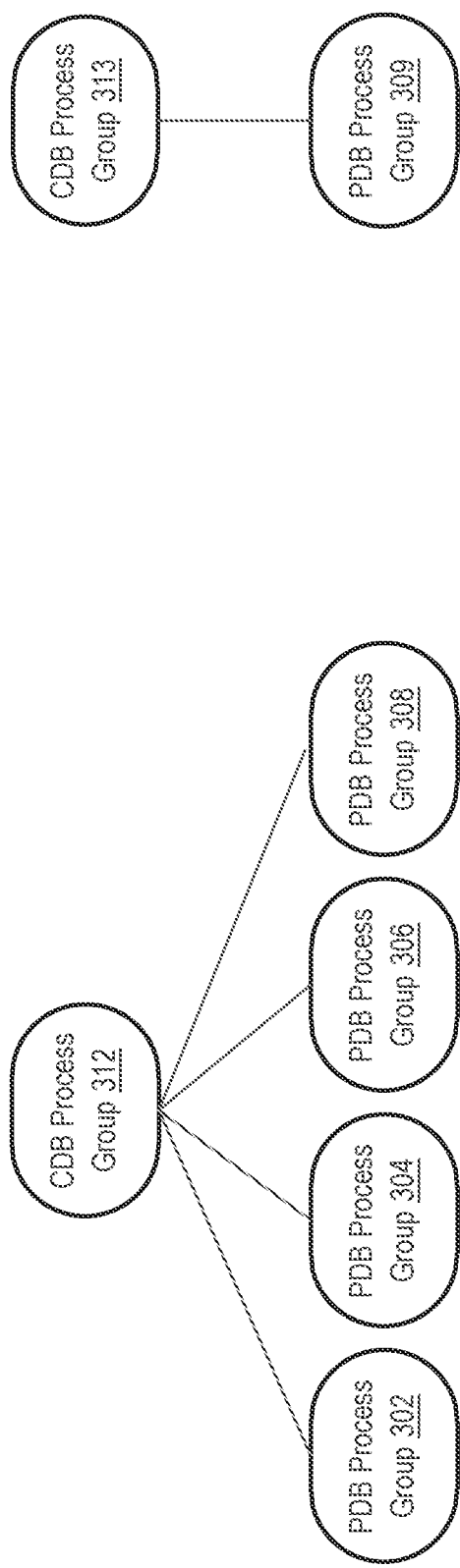
FIG. 3 depicts an example hierarchy of process groups for databases running on a virtual machine, according to an embodiment.

In an embodiment, the grouping service 112 may maintain a hierarchy of process groups for CDBs and PDBs running within the DBMS. FIG. 3 depicts an example hierarchy of process groups for databases running on VM 102. Process group 312 represents a process group for CDB 112 and contains processes for the root database in CDB 112 and running background processes. Process group 302 represents a process group for PDB 202 and contains processes associated with PDB 202. Process group 304 represents a process group for PDB 204 and contains processes associated with PDB 204. Process group 306 represents a process group for PDB 206 and contains processes associated with PDB 206. Process group 308 represents a process group for PDB 208 and contains processes associated with PDB 208. Process group 313 represents a process group for CDB 113 and contains processes for the root database in CDB 113 and running background processes. Process group 312 represents a process group for PDB 209 and contains processes associated with PDB 209.

Process group 312 is depicted as a parent process group for process groups 302, 304, 306, and 308, and process group 313 is depicted as a parent process group for process group 312. This hierarchy allows processes from a parent group to be transferred to a child group when a process is executing tasks for a particular PDB. For instance, when the log writer process, which is assigned to process group 312, begins processing redo logs for PDB 208, then the grouping service 112 will reassign the log writer process to the process group 308. When the log writer process is finished the grouping service 112 will reassign the log writer process back to process group 312. If another PDB needs the log writer process, such as PDB 204, then the group service 112 will reassign the log writer process to process group 304 when the log writer process begins executing tasks for PDB 204.

In an embodiment, the grouping service 112 may send process group information to VMs running CDBs and PDBs. For example, the grouping service 112, upon identifying the processes that belong to process group 302 (for PDB 202), may send process group 302 information to VM 102 for the purposes of monitoring and aggregating metrics associated with the processes belonging to process group 302. By sending process group 302 information to VM 102, VM 102 may aggregate performance metrics for the group of processes in process group 302 and send the aggregated performance metrics to database server 100. If the group of processes in process group 302 changes, e.g. a process in the group terminates, then the grouping service 112 may send updated process group 302 information to VM 102, where the updated information omits the terminated process from process group 302.

Monitoring Service

In an embodiment, the monitoring service 114 is implemented to monitor resource usage of processes in process groups and identify when processes in a process group are strained, which may cause processing bottlenecks for the associated PDB. For example, the monitoring service 114 may collect metrics related to CPU, RAM, and input/output (I/O) information to determine whether processes for a specific PDB are experiencing a bottleneck due to contention of resources.

One example of metrics monitored is pressure stall information (PSI) that may be provided by an operating system, such as the operating systems running on VM 102 and VM 104. PSI metrics provide information for detecting resource shortages, in real-time. For example, PSI metrics may provide statistics detailing the percentage of time a process was delayed due to resource contention for memory resources or any other resource. PSI metrics are useful as they are dependent on the number of available resources and not strictly based on amount of usage. For example, PSI information may indicate that there is no immediate pressure on a process when the process is using 1 MB of memory and the PDB has been allocated 32 MB of memory. However, PSI information may indicate high pressure on the process when the process is using 1 MB of memory and the PDB has only been allocated 1-2 MB of memory. This would be high pressure in this situation because it is likely that the process will experience delays because the remaining processes in the process group will also contend for the 1-2 MB of memory.

One feature that PSI-implemented operating systems have is the ability to aggregate metrics for a set of processes. For example, the certain operating systems have the ability to organize processes hierarchically and may group processes together. The grouping service 112 may provide a process group, such as process group 302, to the operating system running on VM 102, in order to instruct VM 102 to collect PSI metrics for the group of processes belonging to process group 302.

The monitoring service 114 may implement a set of resource thresholds to determine whether a PDB may be migrated from its current CDB to another CDB. In an embodiment, the monitoring service 114 may implement a percentage-based threshold where if resource usage exceeds a percentage of the resources available for a PDB, then the PDB may be migrated to another CDB. For example, the monitoring service 114 may implement a 90% resource usage threshold for PDB 202, where when PSI information indicates that process group 302 usage is above 90% then the monitoring service 114 may send a request to the migration service 116 to migrate PDB 202 to another CDB.

In another embodiment, the monitoring service 114 may implement a soft percentage-based threshold where if resource usage exceeds a lower percentage of the resources available for a PDB, then the PDB may be migrated to another CDB and/or the monitoring service 114 may generate an alert for administrators of the PDB. For example, the soft percentage-based threshold may be based on a lower percentage, such as 80%, where if PSI information indicates that a process group's usage is above 80% then the monitoring service 114 may initiate the migration service 116 to migrate the PDB to another CDB, or the monitoring service 114 may generate an alert indicating the rising pressure on the PDB based on the rising usage rate. Embodiments for generating an alert based on exceeding a threshold are not limited to soft thresholds, and may be generated for any type of monitored event.

In yet another embodiment, the monitoring service 114 may consider historical usage rates for PDBs when determining whether a PDB should be migrated to another CDB. For example, historical resource usage rates of PDB 206 may indicate that PDB 206 usage plateaus after it uses 450 MB of 500 MB allocated. The monitoring service 114 may implement a second threshold, where a first threshold may be based on 90% usage (450 MB out of 500 MB) and the second threshold may be based on 95% usage (475 MB out of 500 MB). If the first threshold is exceeded by PSI metrics for process group 306, the monitoring service 114 may generate alert notifications for database administrators of PDB 206 to indicate the high usage rate. If however, the second threshold is exceeded, then the usage of PDB 206 has exceeded the historical usage plateau and the monitoring service 114 may instruct the migration service 116 to migrate PDB 206 to another CDB.

In yet another embodiment, the monitoring service 114 may track the changing rates of usage of a process group to predict when a process group exceeds a threshold. For example, the monitoring service 114 may collect several PSI metrics over a period of time and may determine a rate of increasing resource usage. For instance, the PSI metrics for PDB 206 may indicate at time T1 only 20% of total resources were used, at time T2 only 30% of total resources were used, and at time T3 only 40% of total resources were used. Based on the received PSI metrics the monitoring service 114 may calculate a usage increase of 10% per time T, which would indicate that at time T8 90% of the total resources would be used, which exceeds a first threshold. In this situation, the monitoring service 114 may issue an alert before the first threshold is exceeded, and/or may instruct the migration service 116 to migrate PDB 206 to another CDB.

The monitoring service 114 may monitor process groups associated with CDBs to determine whether a CDB needs to be migrated from one VM to another VM. For example, the monitoring service 114 may monitor PSI information for process group 312 (CDB 112) to determine whether CDB 112 should be migrated from VM 102 to VM 104. In an embodiment, the monitoring service 114, when monitoring a parent process group, may aggregate PSI information from child process groups in order to determine aggregated usage for a CDB as well as PDBs running within the CDB. For example, when monitoring process group 312, the monitoring service 114 may aggregate PSI information from process group 312 and process groups 302, 304, 306, and 308 to determine whether CDB 112 and its running PDBs (PDB 202-208) should be migrated.

In an embodiment, the monitoring service 114 may implement a policy that defines various thresholds and notification rules for PDBs and CDBs running in database server 100. For example, PDBs 202-208 may be databases that have steady workloads and may enforce a 90% usage threshold policy for migrating PDBs. PDB 209 on the other hand, may be a PDB that processes a varying workload where usage rates may fluctuate. The monitoring service 114 may implement a usage rate based threshold, where the rate of change in PSI information may predict when resources will be exhausted. Additionally, the policy may be used to set different rules for notifying users of usage and pressure rates.

In an embodiment, the monitoring service 114 may gather metrics from VMs 102 and 104, such as PSI information, CPU usage, memory usage, I/O usage, and any other performance metrics, to determine which VMs and CDBs have enough free resources to accept a PDB that needs to be migrated. If, for example based on PSI metrics, PDB 208 needs 2 CPU cores and 500 MB of memory, then the monitoring service 114 may report the resource requirements of PDB 208 to the migration service 116 to determine a destination for PDB 208. The monitoring service 114 may also report PSI information for potential destinations for PDB 208. For example, the monitoring service 114 may report PSI information for other CDBs and PSI information gathered at the VM level for VMs 102 and 104, so that the migration service 116 may determine a suitable destination for PDB 208.

Migration Service

In an embodiment, the migration service 116 is implemented to migrate a PDB from a source CDB to a destination CDB. The migration service 116 may determine the destination of a PDB to be migrated based upon the PDB metrics and metrics for potential destinations of the PDB. For example, if the migration service 116 is tasked with migrating the PDB 202 from CDB 112 to another CDB, then the migration service 116 may take into account the current PSI information for PDB 202 to determine the amount of resources needed to accommodate PDB 202 and current available resources provisioned to the available CDBs, which include CDB 113 and CDB 114. If PDB 208 needs 500 MB of memory and CDB 113 has an available memory allocation size of 1 GB, then the migration service 116 may migrate PDB 202 from CDB 112 to CDB 113. In an embodiment, the migration service 116 may take into account historical resource usage rates of a PDB when determining a destination for migrating the PDB. For instance, if historical PSI information for PDB 204 indicates that PDB 204 is memory usage intensive, then the migration service 116 may select a CDB that has ample memory resources to host PDB 204.

The migration service 116 may migrate a CDB from one VM to another VM. In an embodiment, if the migration service 116 is instructed to migrate a CDB, and its PDBs to another VM, the migration service 116 may determine a destination VM based on PSI metrics collected for each of the available VMs. For example, if CDB 112 is to be migrated from VM 102, the migration service 116 may determine the aggregated PSI metrics for CDB 112, which is a sum of the PSI metrics for: CDB 112, PDB 202, PDB 204, PDB 206, and PDB 208. The aggregated PSI metrics are then compared to available resources and PSI metrics specific to VM 104 and any other VM running within database server 100 (not pictured in FIG. 1). The migration service 116 may determine that VM 104 has enough available resources to accommodate the migration of CDB 112, and its corresponding PDBs 202-208.

Process Overview

Figure 4:
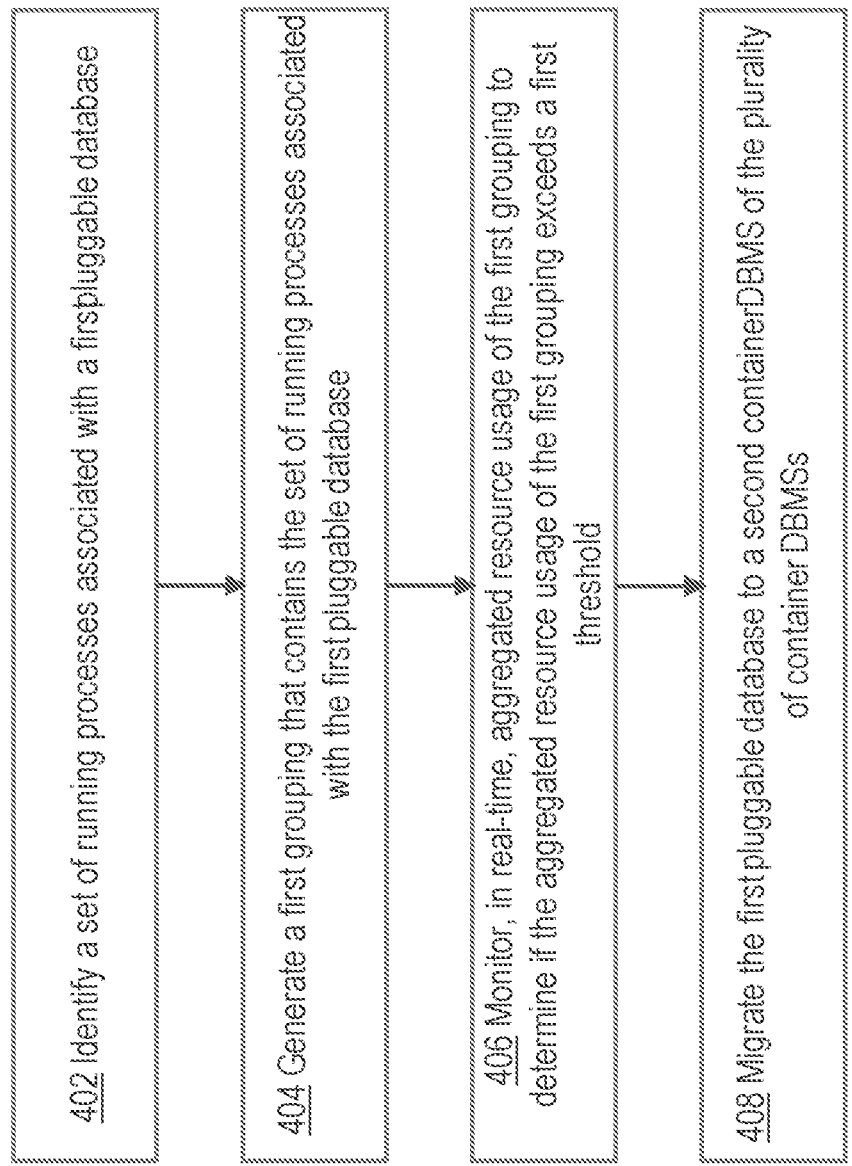
FIG. 4 is a flow diagram that depicts a process 400 for identifying and grouping computing resources dedicated to a pluggable database, monitoring the grouped computing resources, and determining whether the pluggable database should be migrated based on monitored metrics for the grouped computing resources, according to an embodiment.

FIG. 4 is a flow diagram that depicts a process 400 for identifying and grouping computing resources dedicated to a pluggable database, monitoring the grouped computing resources, and determining whether the pluggable database should be migrated based on monitored metrics for the grouped computing resources, according to an embodiment. The steps of the process as shown in FIG. 4 may be implemented using processor-executable instructions that are stored in computer memory. For the purposes of providing a clear example, the steps of FIG. 4 are described as being performed by processes executing in server node 100. For the purposes of clarity, the process described may be performed with more or fewer steps than described in FIG. 4.

At step 402, process 400 identifies a set of running processes associated with a first pluggable database. In an embodiment, the grouping service 112, identifies a set of running processes associated with a first pluggable database. PDB 202 may represent the first pluggable database. The grouping service 112 identifies all running processes associated with PDB 202.

At step 404, process 400 generates a first grouping that contains the set of running processes associated with the first pluggable database. In an embodiment, the grouping service 112 generates process group 302 that contains the running processes associated with PDB 202. In one example, if a process in the process group 302 terminates, then the grouping service 112 may remove the process from the process group 302. Similarly, if a new process, which is associated with PDB 202, is created, then the grouping service 112 adds the new process to the process group 302.

At step 406, process 400 monitors, in real-time, aggregated resource usage of the first grouping to determine if the aggregated resource usage of the first grouping exceeds a first threshold. In an embodiment, the monitoring service 114 monitors aggregated resource usage for process group 302 to determine if the resource usage exceeds a first threshold. The aggregated resource usage may represent PSI information gathered from the operating system running on VM 102, where the PSI information contains aggregated resource information for the running processes that make up process group 302.

In an embodiment, the first threshold may be a percentage-based threshold used to determine when resource usage of process group 302 exceeds a certain percent of the total resources. For example, the first threshold may be set to be 90% of the resources allocated to PDB 202. In another example, the first threshold may be based on historical usage values of processes associated with PDB 202.

In an embodiment, prior to migrating PDB 202, the monitoring service 114 may generate a resource usage alert notification that indicates that PDB 202 is experiencing resource pressure. The alert notification may be sent to clients associated with PDB 202, including database administrators.

At step 408, process 400 migrates the first pluggable database to a second container DBMS of a plurality of container DBMSs. In an embodiment, the migration service 116 migrates the PDB 202 from CDB 112 to CDB 113. The migration service 116 may determine, for each available CDB, amounts of available resources to determine which CDB is able to accommodate PDB 202. Based on the amount of resource needed to host PDB 202 and amounts of available resources on the available CDBs, the migration service 116 selects CDB 113 to host PDB 202. The migration service 116 then migrates PDB 202 from CDB 112 to CDB 113.

Software Overview

Figure 5:
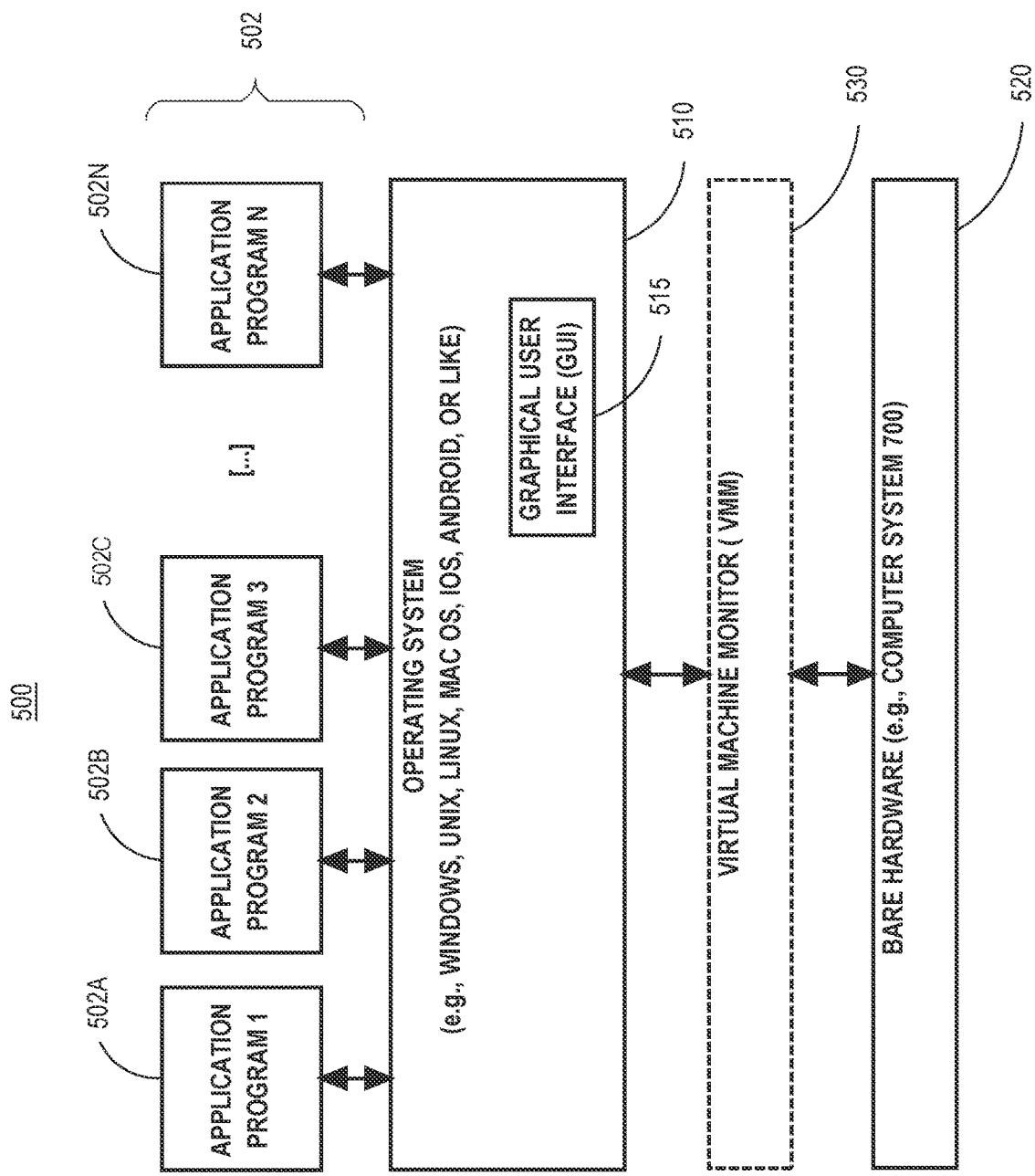
FIG. 5 is a block diagram of a basic software system that may be employed for controlling the operation of computing system.
Figure 6:
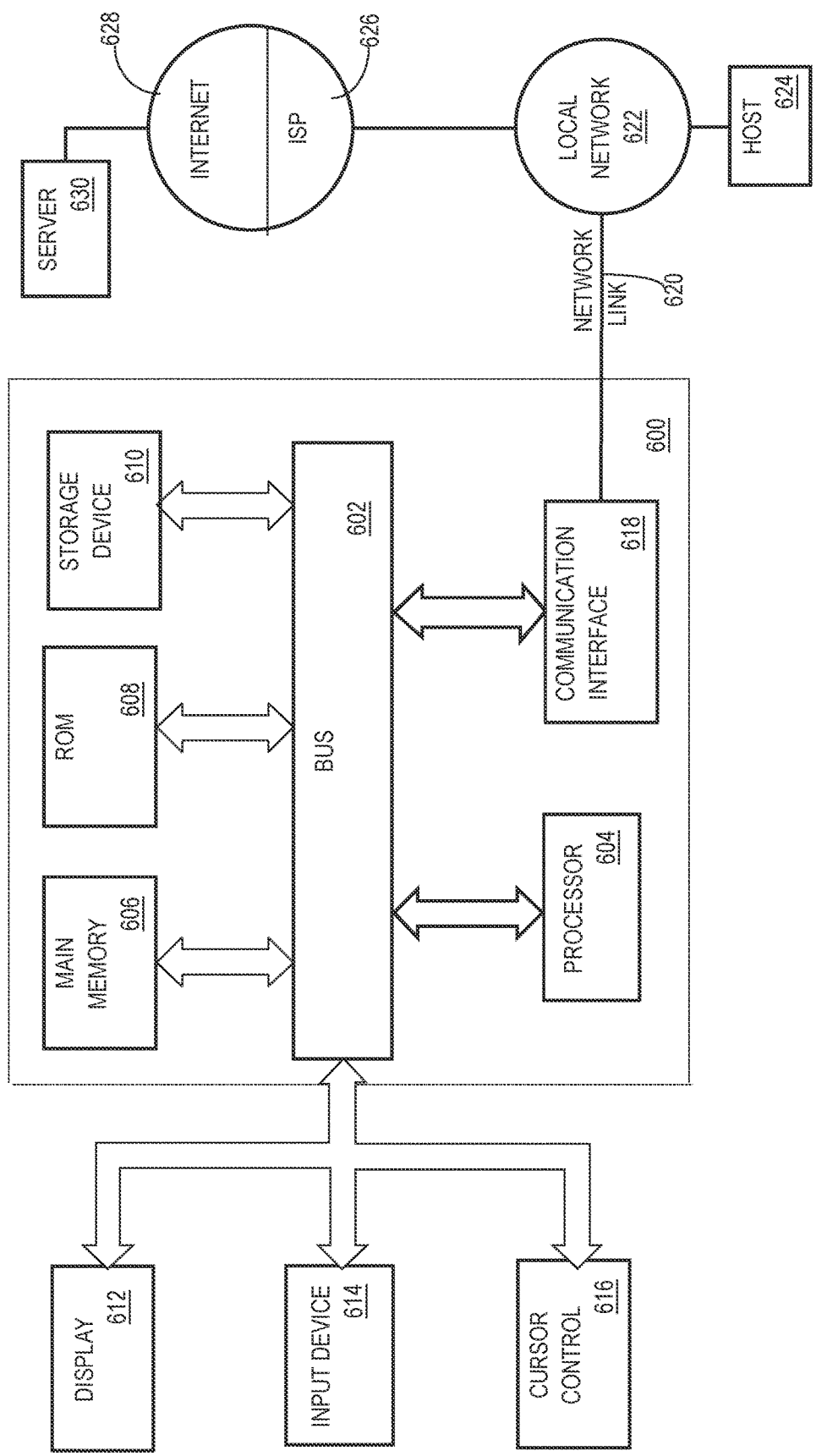
FIG. 6 is a block diagram that illustrates a computer system 600 upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying, by a grouping service, a set of running processes associated with a first pluggable database, wherein said first pluggable database is hosted on a first container DBMS of a plurality of container DBMSs that is hosted on a plurality of virtual machines, wherein a first virtual machine of said plurality of virtual machines hosts said first container DBMS;
   generating, by the grouping service, a first grouping that contains the set of running processes associated with the first pluggable database;
   monitoring in real-time, by a monitoring service, aggregated resource usage of the first grouping to determine if the aggregated resource usage of the first grouping exceeds a first threshold;
   in response to the aggregated resource usage of the first grouping exceeding the first threshold, migrating the first pluggable database to a second container DBMS of the plurality of container DBMSs.

2. The method of claim 1, wherein the aggregated resource usage comprises at least one resource type of a CPU resource, a memory resource, and an input-output resource.

3. The method of claim 2, wherein the aggregated resource usage represents an amount of wait time caused by resource contention on the at least one resource type over a period of time.

4. The method of claim 1, wherein the first threshold is based on a percentage of a number of resources available to the first pluggable database.

5. The method of claim 1, wherein the first threshold is based on historical resource usage of the first pluggable database.

6. The method of claim 1, wherein migrating the first pluggable database to the second container DBMS, comprises:
   determining available resources for each of the plurality of container DBMSs;
   determining an amount of resources needed for running the first pluggable database based on the aggregated resource usage of the first grouping;
   based on the available resources of each of the plurality of container DBMSs and the amount of resources needed for running the first pluggable database, determining that the second container DBMS is able to accommodate the first pluggable database; and
   migrating the first pluggable database to the second container DBMS.

7. The method of claim 6, wherein determining the amount of resources needed for running the first pluggable database is further based on historical resource usages of the first pluggable database.

8. The method of claim 1, further comprising:
   prior to migrating the first pluggable database to a second container DBMS, generating a resource usage alert notification that indicates that the first pluggable database is experiencing resource pressure;
   sending the resource usage alert notification to one or more client users associated with the first pluggable database.

9. The method of claim 1, further comprising:
   upon generating the first grouping, detecting that a first process, of the set of running processes associated with the first pluggable database, has been terminated; and
   removing, by the grouping service, the first process from the first grouping.

10. The method of claim 1, further comprising:
    upon generating the first grouping, detecting that a new process, associated with the first pluggable database, has been spawned; and
    adding, by the grouping service, the new process to the first grouping.

11. A method comprising:
    identifying, by a grouping service, a set of running processes associated with a first container DBMS, wherein said first container DBMS is hosted on a first virtual machine of a plurality of virtual machines, and wherein the first container DBMS hosts a set of pluggable databases;
    generating, by the grouping service, a first grouping that contains the set of running processes associated with the first container DBMS;
    monitoring in real-time, by a monitoring service, aggregated resource usage of the first grouping to determine if the aggregated resource usage of the first grouping exceeds a first threshold;
    in response to the aggregated resource usage of the first grouping exceeding the first threshold, migrating the first container DBMS to a second virtual machine of the plurality of virtual machines.

12. The method of claim 11, wherein the first grouping further contains sets of running processes associated with the set of pluggable databases hosted by the first container DBMS.

13. A non-transitory computer-readable storage medium storing sequences of instructions that, when executed by one or more processors, cause:
    identifying, by a grouping service, a set of running processes associated with a first pluggable database, wherein said first pluggable database is hosted on a first container DBMS of a plurality of container DBMSs that is hosted on a plurality of virtual machines, wherein a first virtual machine of said plurality of virtual machines hosts said first container DBMS;

generating, by the grouping service, a first grouping that contains the set of running processes associated with the first pluggable database;

monitoring in real-time, by a monitoring service, aggregated resource usage of the first grouping to determine if the aggregated resource usage of the first grouping exceeds a first threshold;

in response to the aggregated resource usage of the first grouping exceeding the first threshold, migrating the first pluggable database to a second container DBMS of the plurality of container DBMSs.

14. The non-transitory computer-readable storage medium of claim 13, wherein the aggregated resource usage comprises at least one resource type of a CPU resource, a memory resource, and an input-output resource.

15. The non-transitory computer-readable storage medium of claim 14, wherein the aggregated resource usage represents an amount of wait time caused by resource contention on the at least one resource type over a period of time.

16. The non-transitory computer-readable storage medium of claim 13, wherein the first threshold is based on a percentage of a number of resources available to the first pluggable database.

17. The non-transitory computer-readable storage medium of claim 13, wherein migrating the first pluggable database to the second container DBMS, comprises:

determining available resources for each of the plurality of container DBMSs;

determining an amount of resources needed for running the first pluggable database based on the aggregated resource usage of the first grouping;

based on the available resources of each of the plurality of container DBMSs and the amount of resources needed for running the first pluggable database, determining that the second container DBMS is able to accommodate the first pluggable database; and migrating the first pluggable database to the second container DBMS.

18. The non-transitory computer-readable storage medium of claim 13, the sequences of instructions including instructions that, when executed by the one or more processors, cause:

prior to migrating the first pluggable database to a second container DBMS, generating a resource usage alert notification that indicates that the first pluggable database is experiencing resource pressure;

sending the resource usage alert notification to one or more client users associated with the first pluggable database.

19. The non-transitory computer-readable storage medium of claim 13, the sequences of instructions including instructions that, when executed by the one or more processors, cause:

upon generating the first grouping, detecting that a first process, of the set of running processes associated with the first pluggable database, has been terminated; and removing, by the grouping service, the first process from the first grouping.

20. The non-transitory computer-readable storage medium of claim 13, the sequences of instructions including instructions that, when executed by the one or more processors, cause:

upon generating the first grouping, detecting that a new process, associated with the first pluggable database, has been spawned; and adding, by the grouping service, the new process to the first grouping.

21. A non-transitory computer-readable storage medium storing sequences of instructions that, when executed by one or more processors, cause:

identifying, by a grouping service, a set of running processes associated with a first container DBMS, wherein said first container DBMS is hosted on a first virtual machine of a plurality of virtual machines, and wherein the first container DBMS hosts a set of pluggable databases;

generating, by the grouping service, a first grouping that contains the set of running processes associated with the first container DBMS;

monitoring in real-time, by a monitoring service, aggregated resource usage of the first grouping to determine if the aggregated resource usage of the first grouping exceeds a first threshold;

in response to the aggregated resource usage of the first grouping exceeding the first threshold, migrating the first container DBMS to a second virtual machine of the plurality of virtual machines.

22. The non-transitory computer-readable storage medium of claim 21, wherein the first grouping further contains sets of running processes associated with the set of pluggable databases hosted by the first container DBMS.

* * * * *